United States Patent Office 3,334,888
Patented Aug. 8, 1967

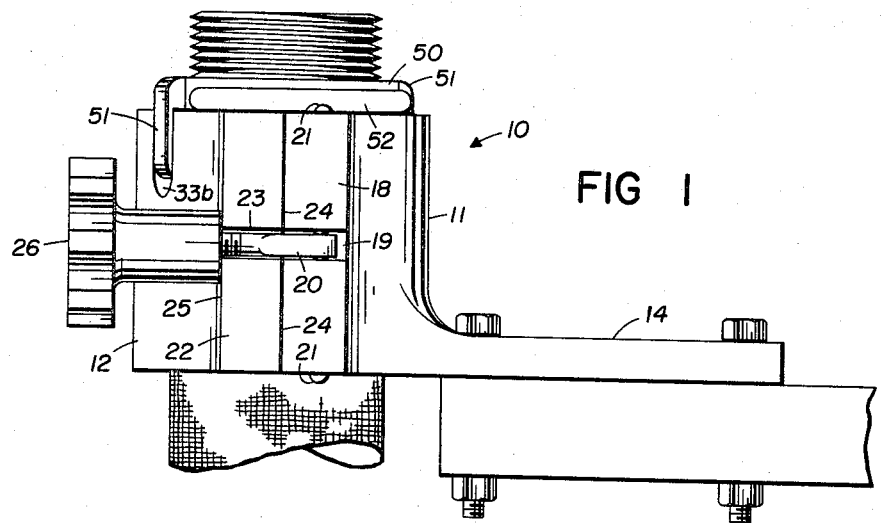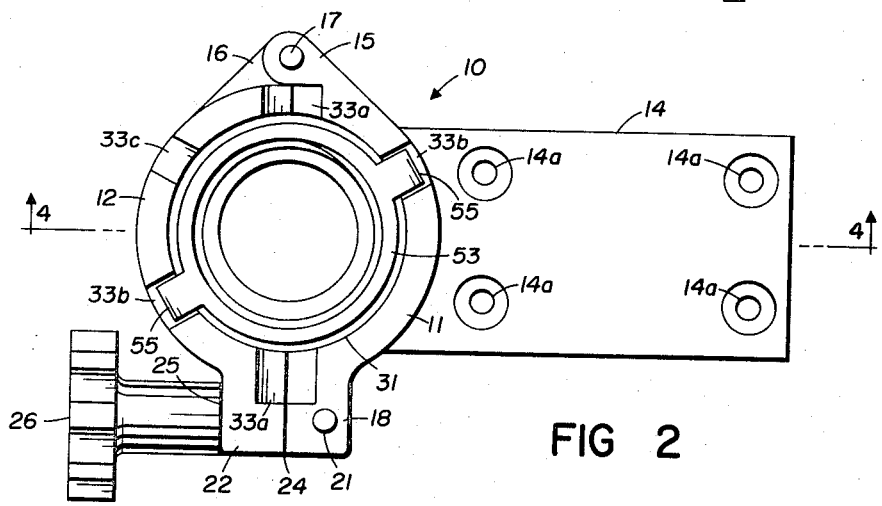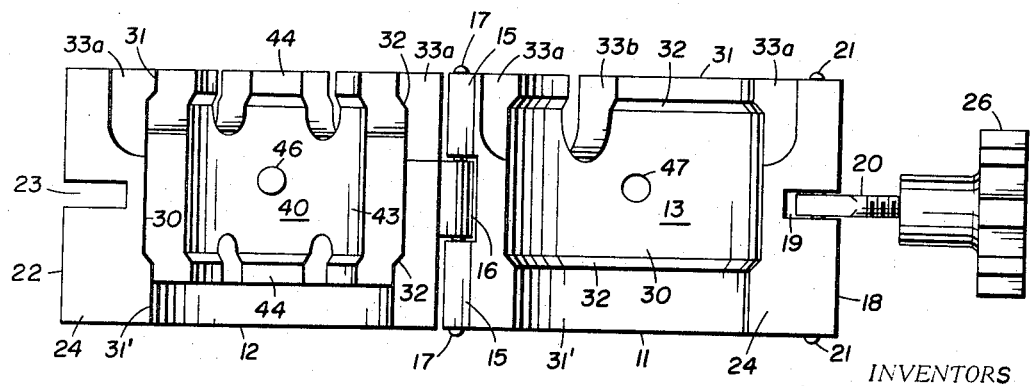

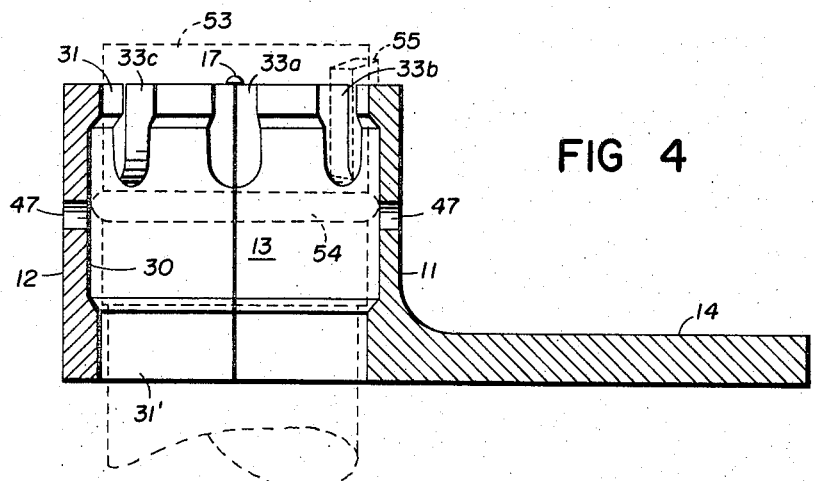
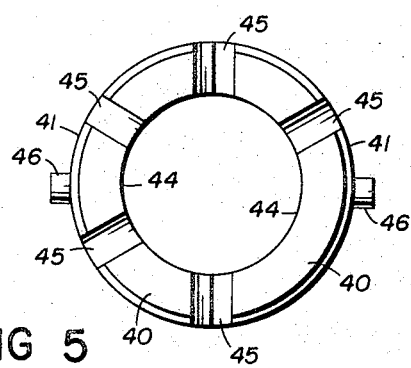
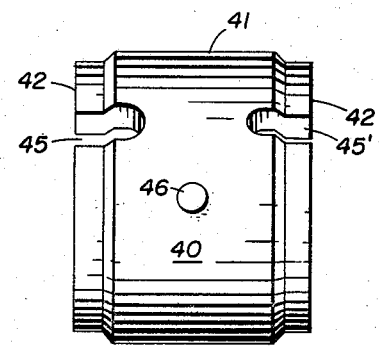
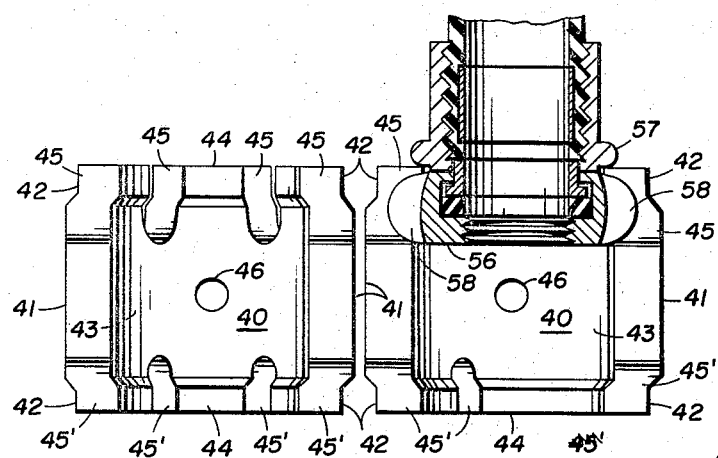

3,334,888
HOLDER FOR HOSE COUPLINGS
Alvin A. Koranda, 2234 W. 2nd St., Davenport, Iowa 52802, and James F. Humphreys, 2203 Parkway Drive, Bettendorf, Iowa 52722
Filed Apr. 19, 1965, Ser. No. 449,181
6 Claims. (Cl. 269—287)

ABSTRACT OF THE DISCLOSURE

A holder for repair or replacement of male and female fire hose couplings of various sizes having circumferentially spaced, radially projecting lugs or pins on their outer surfaces. The holder, in its preferred form, includes a pair of split jaws, openable to receive couplings of the foregoing kind, which jaws closely embrace but do not squeeze the coupling disposed therein. The jaws are provided with suitable recesses and reliefs therein in order to accommodate the different lug or pin patterns of the largest size of such couplings and to prevent rotation thereof while the coupling is being repaired or replaced. One or more pairs of split inserts are also provided which fit within the jaws and are equipped with like recesses and reliefs in order to accommodate different lug or pin patterns of the smaller sizes of such couplings.

---

The present application is a continuation-in-part of application Ser. No. 198,131, filed May 28, 1962, now abandoned.

Background of the invention

As is well known, a fire hose comprises many separate lengths, generally of 50 feet, each length having a threaded female coupling of the swivel type at one end and a complementary threaded male coupling at the other, both firmly and relatively permanently secured to the hose. When, at a fire, a span of hose must be made up from several lengths, obviously the faster the lengths can be joined the sooner the blaze can be attacked. For this reason, couplings which require wrenches or similar implements are avoided and instead the respective couplings are fashioned so that their swivels can be spun up tight by hand, thus greatly speeding the makeup of a hose when time is critical. Accordingly, it is supremely important that the respective couplings, especially their threads, be maintained in the best possible condition.

Unfortunately the threads of couplings of the types currently in widespread use in this country often become damaged to an extent that they must be "chased" before they will permit quick hand tightening. Thread damage arises chiefly after use of the hose when it is being disconnected into its separate lengths prior to storage. At this time a wrench is usually needed to separate the couplings because the water pressure tends to tighten their joints beyond ability to disconnect them by hand. During use of the wrench, the hose is usually lifted from the pavement and afterwards the separated ends often fall or drop down thereon, injuring particularly the exposed male threads or bending the female swivels. Then, too, dragging disconnected hose lengths over the pavement while they are being returned to the pumper or other transporter may also damage the couplings. Injury occurs even in cases of those couplings provided with circumferentially extending protective bumpers on their outer surfaces in order to shield the threads and swivels in these very instances.

In any event, whether to chase damaged threads or to replace the coupling itself as may be necessary from time to time, obviously the coupling must be securely held. If an ordinary straight or flat jawed vise is used, as is often the practice, not only is the coupling imperfectly held, but, above all, the pressure of the jaws tends to distort or bend the coupling out of round, whereup the ability quickly and easily to joint the coupling with another by hand is impaired and the threads of both subject to damage if the connection is forced. In addition, the projecting lugs or pins with which all such couplings are equipped in order to assist their connection or disconnection, or the protective bumpers on the outer surface of the coupling, make it even more difficult for such vises to get a satifactory grip upon the coupling. Accordingly, the chief object of the present invention is to provide a form of holder which will not only securely hold a male or female hose coupling without damage during its replacement or the repair of its threads but which is also readily adaptable to couplings of different designs and diameters.

Summary of the invention

Briefly described, the present invention incorporates a coupling holder having a pair of jaws in the general form of a split sleeve, the split halves thereof being hinged at one pair of their adjoining edges in order to be opened to receive the coupling therein and provided at their other pair of adjoining edges with a releasable clamp to maintain the split halves closed about the coupling when inserted therein. Since the couplings in general use in this country are confined to a few standard configurations and sizes, the jaws are designed to be adaptable to all, thus greatly increasing the utility of the holder. For this purpose the split jaws are equipped with suitable recesses in order to adapt them to receive couplings having various lug or pin patterns, the lug or pins and the recesses cooperating to restrain the couplings from rotation when in the split jaws. This cooperation between the lugs or pins on the one hand and the recess on the other make it unnecessary for the jaws to clamp or squeeze the couplings themselves in order to prevent such rotation relative to the holder, which is one of the important features of the present invention. In addition, the jaws are formed to permit both male and female couplings of different designs to be inserted, and in different positions, depending upon the nature of the work to be done. Several diameters of couplings are accommodated by making the split jaws big enough to receive couplings of the largest diameter and then providing one or more sets of split inserts reducing the inner diameter of the split jaws in order to fit couplings of lesser diameter.

Brief description of the drawings

FIGURE 1 is a side elevation of a coupling holder according to the present invention shown in its closed position, one form of a male coupling being shown located therein;

FIGURE 2 is a top plan view of a coupling holder in its closed position, but with one form of a female coupling shown located therein;

FIGURE 3 is similar to FIGURE 1 but illustrates the coupling holder in its open position, the swinging half being shown with one of a pair of split inserts located therein;

FIGURE 4 is a vertical section taken along the line 4—4 of FIGURE 2;

FIGURE 5 is a top plan view of a pair of split inserts for the coupling holder of FIGURE 1;

FIGURE 6 is a side view of the inserts of FIGURE 5; and

FIGURE 7 is an elevational view of the split inserts of FIGURE 5 in open position, a female coupling being shown disposed therein for removal from its hose.

*Description of the preferred embodiment*

In the drawings, the reference numeral 10 designates generally a coupling holder according to the present invention. Holder 10 comprises essentially a generally annular member split along a diametrical plane in order to form a fixed jaw 11 and a swinging jaw 12 provided with inner jaw faces 13, each of the latter being of complementary, semi-circular configuration with respect to a plane normal to its axis. Fixed jaw 11 is formed at one axial end with a base 14 in the shape of a tongue-like member extending radially therefrom. Base 14 is equipped with several holes 14a therethrough or other suitable means by which it may be securely fixed to a supporting surface, such as a work bench, so that the axis of jaw 11 is disposed upright. The outer peripheral surface of fixed jaw 11 adjacent one of the abutting edges of swinging jaw 12 is provided with a pair of spaced, upper and lower hinge bosses 15 and the corresponding adjacent surface of swinging jaw 12 is provided with a single, centrally disposed hinge boss 16 fitted between hinge bosses 15. The latter and hinge boss 16 are drilled to receive a vertical hinge pin 17. The remaining pair of abutting edges of jaws 11 and 12 are equipped with any suitable releasable clamping mechanism. That illustrated utilizes a boss 18 provided on the outer peripheral surface of jaw 11 immediately adjacent the latter pair of abutting edges of jaws 11 and 12 and horizontally slotted at 19 to receive one end of a clamp bolt 20 pivotally secured to boss 18 about a vertical hinge pin 21 therethrough. A similar boss 22 is provided on the corresponding adjacent surface of swinging jaw 12 and horizontally slotted at 23 to receive the shank of clamp bolt 20 therein, the opposed surfaces 24 of bosses 18 and 22 mating in a diametrical plane through the axis of jaws 11 and 12. Boss 22 is provided with a flat shoulder 25, parallel to the mating surfaces 24 of bosses 18 and 22, against which bears the inner end of a knurled hand knob 26 threaded on the outer end of clamp bolt 20. Thus by backing off hand knob 26 and swinging it and clamp bolt 20 outwardly about hinge pin 21, jaw 12 is released and may itself in turn be swung about hinge pin 17 in order to open holder 10 for insertion of a coupling therein. Preferably jaws 11 and 12, their respective bosses 15, 16, 18 and 22, and base 14 are all cast integrally from suitable material such as a high tensile strength aluminum alloy.

The inner faces 13 of jaws 11 and 12 are radially enlarged in order to provide an annular recess 30 extending axially over the major portion of faces 13, thereby forming a pair of upper and lower shoulders 31, 31' of lesser diameter than recess 30, shoulder 31 having somewhat lesser axial extent than shoulder 31'. The steps between recess 30 and shoulders 31, 31' are preferably beveled as at 32. The upper peripheral ends of jaws 11 and 12 are equipped with five, circumferentially disposed, U-shaped reliefs 33a, 33b and 33c, all collectively referred to as "reliefs 33," extending radially through the walls of jaws 11 and 12. Reliefs 33 extend uniformly down into recess 30 and open upwardly through the upper ends of jaws 11 and 12. The width and circumferential disposition of reliefs 33 are best shown in FIGURE 2 and are such as to fittingly receive the radially projecting lugs or pins of hose couplings having either two or three such lugs or pins circumferentially equally spaced thereabout. For this purpose two reliefs 33a are disposed diametrically opposite each other, in the plane of faces 24 of jaws 11 and 12, and formed wide enough to receive the large couplings having two large lugs. Two other reliefs 33b are also disposed diametrically opposite each other and are narrower in order to fit those large couplings also having two lugs but of narrower width. The remaining relief 33c is disposed as shown which together with reliefs 33b will receive the large couplings having three equally spaced lugs of the narrower size.

The diameter of jaw faces 13 is made large enough to accommodate the largest size of couplings to be serviced. This diameter should be great enough so that jaws 11 and 12 do not grip the couplings, at least to any substantial extent, but merely closely surround them, rotation of the couplings being prevented by their respective lugs or pins in reliefs 33, whence no forces are exerted upon the couplings to distort or bend them out of round. Currently, the largest such couplings generally in use are those fitted to 2½" diameter hose, the smaller diameter hose currently in general use being 1½". In order to accommodate couplings of the latter size hose, a pair of removable, adapter inserts 40 are provided. The latter take the form of a split sleeve, each half thereof fitting within jaws 11 and 12 against faces 13, for which purpose the outer faces of inserts 40, which may be of material similar to that of jaws 11 and 12, are machined to provide a centrally disposed, protruded annulus 41 and a pair of intruded shoulders 42 at each axial end thereof complementary in turn with recess 30 and shoulders 31, 31', respectively, of jaws 11 and 12. The shoulders 42 of inserts 40 are sufficiently broad so that when inserts 40 are disposed within jaws 11 and 12 the upper ends of the former are flush with the upper ends of the latter. The inner surfaces of inserts 40 are machined in turn to provide a central recess 43 and a pair of symmetrical shoulders 44 of the same axial lengths, though, of course, of less diameter than recess 30 and shoulder 31 of jaws 11 and 12 in order that either axial end of inserts 40 may be placed uppermost. Each axial end of inserts 40 is provided with a set of reliefs 45, 45' corresponding in location and nature to reliefs 33 of jaws 11 and 12, reliefs 45 being proportionally smaller than reliefs 33 and reliefs 45' proportionally smaller than reliefs 45 in view of the correspondingly smaller lugs of the two and three lug smaller couplings. The symmetrical feature of inserts 40 permits either reliefs 45 or 45' to be placed uppermost, depending upon the lug or pin size of the smaller coupling to be serviced. In order to retain inserts 40 in either position within jaws 11 and 12, the outer surface of each is provided with a centrally disposed, radially extending dowel pin 46 received in turn in one of a pair of complementary bores 47 in the walls of jaws 11 and 12.

The adaptability of holder 10 to various sizes and forms of hose couplings, as well as to the various operation to be preformed thereon, will now be described. When, for instance, the male threads of a coupling are to be chased, the coupling may be disposed within holder 10 in the manner shown in FIGURE 1 with the threads conveniently exposed above jaws 11 and 12. In such case the body 50 of the coupling is encased by the upper shoulder 31, the lugs or pins 51 fitting within appropriate ones of reliefs 33 and preventing rotation of the coupling relative to holder 10. If the coupling is of the type having protective bumpers 52, the latter merely sit atop jaws 11 and 12 as shown. When, on the other hand, the female threads of a coupling are to be chased, the coupling may be disposed as shown in FIGURES 2 and 4, in which event the body of its swivel 53 will be embraced in a similar manner by shoulder 31, or, in case it is provided with protective bumpers 54, the latter fit within recess 30, its lugs or pins 55 also fitting in appropriate ones of reliefs 33 to restrain rotation. When the inserts 40 are employed, the locations therein of the smaller couplings of various patterns is similar to that just described in the case of the larger couplings in jaws 11 and 12, no matter which end of inserts 40 is uppermost. For instance, in the case of a female coupling to be replaced, it is inserted in the manner shown in FIGURE 7. In this case, the shoulder 44 encases the body 56 of the coupling, or if it it is provided with protective bumpers 57, the latter may fit atop shoulders 44, as shown, or within the recess 43, as the case may be; in either situation, the lugs or pins 58 sit within the appropriate ones of reliefs 45 and prevent rotation of the coupling relative to holder 10. A like disposition is made in the case of replacement of the male coupling. In any event, it will be apparent that in order to achieve the foregoing adaptability of holder 10, the diameters of recess 30 (or 43) and shoulders 31 (or 44) and their axial lengths must be such that the various coupling concerned can be accommodated without any interference by jaws 11 and 12 tending to distort the couplings. In the same vein, the dimensions of reliefs 33 (or 45, 45') must be enough to permit sufficient insertion of the various couplings for recess 30 (or 43) and shoulder 31 (or 44) to accommodate the coupling bumpers or bodies, as the case may be.

While the present invention has been described with reference to a particular embodiment and detailed descriptive language has been used, it is not so limited. Instead, the following claims are to be read as encompassing all modifications and adaptations of the invention falling within the spirit and scope thereof.

We claim:

1. A holder for repair or replacement of circular fire hose couplings of the kind described having a plurality of circumferentially spaced, radial projections on their outer peripheral surfaces, said holder comprising: a pair of jaws having complementary inner jaw faces effective in a jaws closed position to closely embrace the outer peripheral surfaces of said couplings without any distorting pressure thereon, the opposite ends of said jaws being open in order to permit said couplings to protrude therebeyond, at least one of said jaws being movable with respect to the other to a jaws open position in order to permit insertion of said couplings between said jaw faces, both of said jaws including means operative upon each of said jaws to maintain said jaws in their closed position about said couplings when inserted between said jaw faces as aforesaid, said jaw faces having an annular recess disposed between the axial ends of said jaws providing a shoulder between said recess and an axial end of said jaw faces of lesser diameter than said recess, said recess and shoulder being of dimensions effective to fittingly receive respective peripheral portions of said couplings when located within said jaw halves in their jaws closed position, a plurality of reliefs in the walls of said jaw faces effective to receive said couplings projections therein and to restrain rotation of said couplings relative to said jaws when said jaws are in their closed position about said couplings as aforesaid, said reliefs having a U-shape extending axially of the walls of said jaw halves and opening through said shoulder and axial ends of said jaws, the closed ends of said reliefs extending uniformly into said recess with respect to said axia end of said jaw halves effective to receive said radial projections of said couplings when operatively located in said jaw halves in their jaws closed position, said jaws having means for fixed mounting thereof to a rigid support.

2. The device of claim 1 wherein said jaws comprise a pair of jaw halves having each of said jaw faces of semi-circular configuration in cross-section and split along a diametrical plane through their axis, one pair of the abutting edges of said jaw halves being hingedly secured to each other about a hinge axis parallel to said jaw face axis in order to provide for movement of one of said jaw halves about said hinge axis to said jaws open position, the other of said jaw halves including said mounting means fixed thereto, the other pair of the abutting edges of said jaw halves being provided with releasable means effective to maintain said jaw halves in said jaws closed position.

3. The device of claim 2 wherein said releasable means includes a shoulder parallel to said diametrical plane and fixedly disposed adjacent one of the other pair of the abutting edges of said jaw halves, and a clamp assembly having a portion hingedly secured adjacent the other one of said other pair of abutting edges about a hinge axis parallel to said jaw face axis, another portion of said clamp assembly being engageable with said shoulder effective, when said jaw halves are in said jaws closed position and said assembly is swung about its hinge axis, to clampingly secure said other pair of abutting edges to each other between said clamp hinge axis and said shoulder.

4. A holder for repair or replacement of circular fire hose couplings of the kind described of two different diameters, said couplings being of the kind having a plurality of radially projecting lugs circumferentially spaced about their outer peripheral surfaces, said holder comprising: a fixed jaw and a swinging jaw, each of said jaws being of half shell-like configuration having complementary inner jaw faces of semi-circular configuration in cross-section and open axial ends, one pair of the abutting edges of said jaws being hinged to each other about an axially parallel hinge axis effective to permit said swinging jaw to be moved from a closed to an open position with respect to said fixed jaw, said fixed jaw including integral means for fixedly securing said jaw to a rigid support, both of said jaws having means disposed adjacent each of the other pair of their abutting edges cooperating to releasably maintain said jaws in their closed position, one axial end of said jaws being provided with a plurality of reliefs circumferentially spaced about said end coincidental with said circumferential spacing of said coupling lugs, each of said reliefs being of U-shape and extending radially through the walls of said jaws, the closed ends of said reliefs being uniformly spaced from said end of said jaws, said reliefs extending axially of said walls and opening through said jaw end, the diameter of said jaw faces being sufficient to closely encompass said couplings of the larger diameter without any pressure thereon distorting said couplings when said jaws are in their closed position, and the dimensions of said reliefs being sufficient to fittingly receive the lugs of said larger couplings when disposed within said jaws as aforesaid and to restrain said couplings against rotation relative to said jaws.

5. The device of claim 4 wherein said jaw faces are provided with an annular recess axially disposed between the axial ends of said jaws and forming a shoulder of lesser diameter than said recess at said axial end of said jaws, the closed ends of said reliefs extending axially into said recess, the dimensions of said recess and shoulder being effective to operatively receive respective peripheral portions of said larger couplings when disposed in said jaws as aforesaid.

6. The device of claim 5 including a pair of reversible jaw inserts, said inserts being of complementary half-shell configuration, each of said inserts having its outer face complementary to and fitting within one of said jaw faces, one axial end of said inserts being flush with said axial end of said jaws, the inner faces of said inserts being of complementary semi-circular configuration in cross-section having an annular recess centrally disposed between the axial ends of said inserts and providing a pair of symmetrical shoulders at the axial ends thereof of lesser diameter than said recess, said inserts having a set of U-shaped reliefs spaced about each axial end thereof equal in circumferential spacing to said jaw reliefs, said reliefs opening radially through the walls of said inserts, the closed ends of each set of said reliefs being located in said recess and equally and uniformly spaced from its respective axial end of said inserts, said reliefs extending axially of the walls of said inserts and opening through their respective axial ends, and means removably retaining said inserts within said jaws and restraining said inserts from rotation relative thereto, the diameter of said inner insert faces being sufficient to closely encompass said couplings of the lesser diameter without any pressure thereon distorting said couplings when said jaws are in their closed position, and the dimensions of said insert recess, shoulders and reliefs being sufficient to operatively receive respective peripheral portions of said lesser diameter couplings and said lugs thereof when disposed therewithin as aforesaid and to restrain rotation of said couplings relative to said inserts.

References Cited
UNITED STATES PATENTS

| | | | |
|---|---|---|---|
| 527,200 | 10/1894 | Hall | 269—128 X |
| 1,694,474 | 12/1928 | Lainer | 269—128 |

ROBERT C. RIORDON, *Primary Examiner.*

J. F. McKEOWN, *Assistant Examiner.*